United States Patent
Malhis

(10) Patent No.: US 6,689,925 B2
(45) Date of Patent: Feb. 10, 2004

(54) CONVERSION OF DRILLING WASTE TO FUEL

(75) Inventor: Souheil Malhis, Kiel (DE)

(73) Assignee: Invifuel Ltd., Calgary (CA)

( * ) Notice: Subject to any disclaimer, the term of this patent is extended or adjusted under 35 U.S.C. 154(b) by 40 days.

(21) Appl. No.: 10/147,361

(22) Filed: May 13, 2002

(65) Prior Publication Data

US 2003/0083532 A1 May 1, 2003

Related U.S. Application Data

(60) Provisional application No. 60/290,068, filed on May 11, 2001.

(51) Int. Cl.⁷ .......................... C07C 4/00; C10G 17/02; C10G 17/04
(52) U.S. Cl. .......................... 585/240; 208/424; 208/13; 208/265
(58) Field of Search .......................... 585/240; 208/424, 208/13, 265

(56) References Cited

U.S. PATENT DOCUMENTS

| 4,936,921 A | 6/1990 | Berruex .......................... 134/1 |
| 5,570,749 A | 11/1996 | Reed .......................... 175/66 |
| 5,614,101 A | 3/1997 | DeWalls et al. .......................... 210/708 |
| 5,651,831 A | 7/1997 | Kruse .......................... 134/18 |
| 5,882,524 A | 3/1999 | Storey et al. .......................... 210/712 |
| 5,909,774 A | 6/1999 | Griffith et al. .......................... 166/312 |
| 5,922,277 A | 7/1999 | Donhoff et al. .......................... 422/1 |
| 6,123,483 A | 9/2000 | Langenecker .......................... 405/128 |
| 6,153,017 A | 11/2000 | Ward et al. .......................... 134/10 |
| 6,160,194 A | 12/2000 | Pignatello .......................... 588/205 |
| 6,190,526 B1 | 2/2001 | Ho .......................... 204/515 |

Primary Examiner—Thuan D. Dang
(74) Attorney, Agent, or Firm—Christensen O'Connor Johnson Kindness PLLC

(57) ABSTRACT

Drilling waste resulting from drilling processes of oil and gas wells using hydrocarbons based drilling fluids contains not only hydrocarbons but also the separated cuttings, and other organic and inorganic additives. This kind of waste contains a considerable amount of hydrocarbons and is classified as a hazardous waste. The present invention claims a method for remediation of said drilling waste, where the drilling waste is converted to a solid fuel that is environmentally friendly for storage, transportation and incineration. The said solid fuel no longer presents danger to the surrounding area and groundwater and has an economical energy value. Using several treatment stages, the residual emulsifiers in the drilling waste are chemically in an acidic milieu destabilized and the soil is turned accessible to the hydrocarbons. By using a polyelectrolyte in aqueous slurry, the hydrocarbon molecules are coagulated and, under normal conditions, irreversibly homogenously adsorbed on the soil particles. Finally, separation and dewatering of the said solid fuel can be easily accomplished. The process secures immobilization of the hydrocarbons and no loss in BTU value of the original drilling waste. The BTU value of the converted fuel can be increased by separation of large particulates from the aqueous slurry before immobilization of the hydrocarbons. After rinsing the separated particulates with water, they become free of hydrocarbons and can be left onsite.

27 Claims, 1 Drawing Sheet

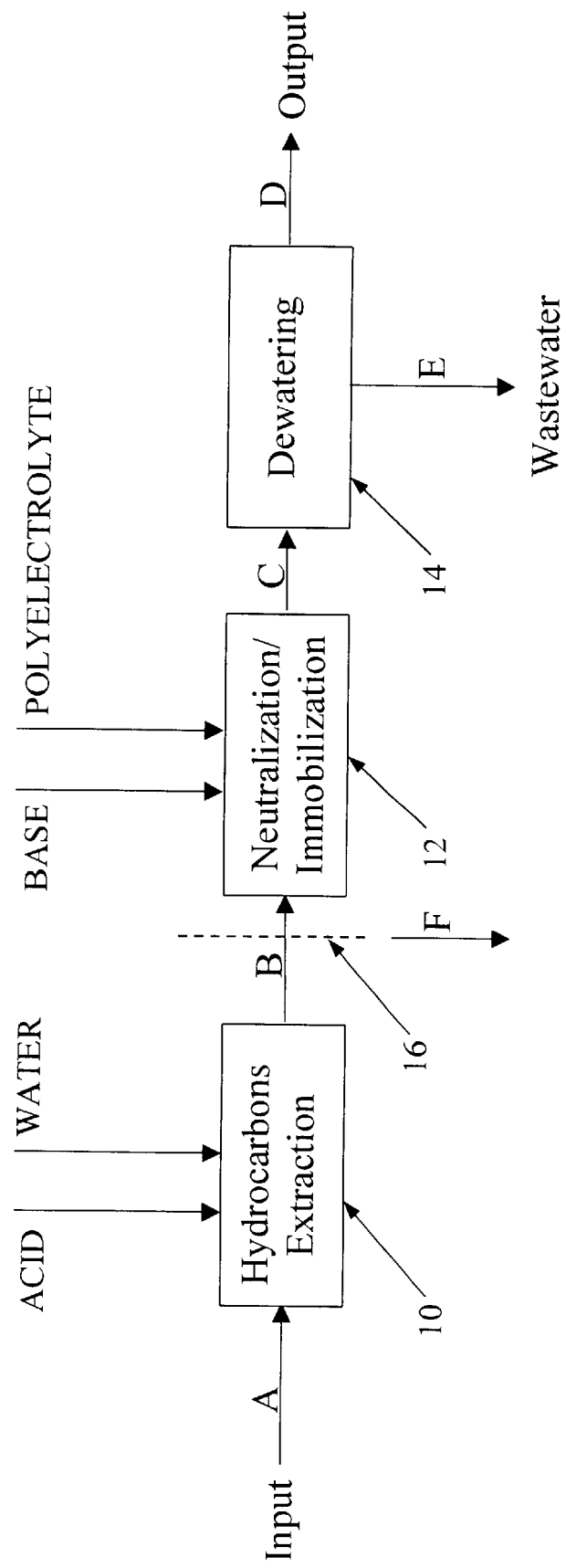

CONVERSION OF DRILLING WASTE TO FUEL

CROSS-REFERENCE TO RELATED APPLICATIONS

This application claims the benefit of the filing date of U.S. Provisional Application No. 60/290,068, filed May 11, 2001.

BACKGROUND OF THE INVENTION

Fluids returned to surface after well drilling are a mixture of fluids used in drilling along with well cuttings and downhole fluids. The drilling wastes may include lime, emulsifiers, filler, salts, hydrocarbons, formation particulates and water. The particulates may include surface soil and fragments of any rock that the well penetrated. Fluids returned to surface after drilling are processed upon their return to surface to recover expensive components, and the remainder must be disposed of. For example, treatment of the returned fluids may include processing in a shaker to remove larger particulates (shaker cuttings) followed by processing in a centrifuge to remove smaller particulates (centrifuge cuttings). Once the cuttings have been removed, the remaining fluid is recycled for re-use downhole. Shaker cuttings may represent 50–75% of the whole separated cuttings, while centrifuge cuttings may comprise 25% to 50%. The cuttings, once separated from the drilling fluid, are combined in open storage tanks. In a single well that is 2.5 km deep, about 180 $m^3$ of cuttings is produced.

The combined cuttings are referred to as drilling waste. The drilling waste is typically black with a strong hydrocarbon odor, and is a sloppy, sticky, stony mass with a density of 1.5–1.8 g/ml that typically exhibits leaching behavior. The drilling waste is conventionally disposed of by such methods as bio-remediation, stabilization followed by land filling, thermal desorption and thermal treatment. These disposal methods have a tendency towards expense or ongoing environmental hazard. This invention is directed towards an environmentally friendly and economical method of disposing of drilling wastes.

SUMMARY OF THE INVENTION

Accordingly, there is provided according to an aspect of the invention, a method for remediation of drilling waste, where the drilling waste is converted to a solid fuel that is environmentally friendly for storage, transportation and combustion. The solid fuel presents no longer danger to the surrounding area and groundwater and has an economical energy value. Using several treatment stages, residual emulsifiers in the drilling waste are chemically in an acidic milieu destabilized and the soil is turned accessible to the hydrocarbons. By using for example a polyelectrolyte in aqueous slurry the hydrocarbon molecules are coagulated and, under normal conditions, irreversibly homogenously adsorbed on the soil particles. Finally, separation and dewatering of the solid fuel can be easily accomplished. The process secures immobilization of the hydrocarbons and no loss in BTU value of the original drilling waste. The BTU value of the converted fuel can be increased by separation of large particulates from the aqueous slurry before immobilization of the hydrocarbons. After rinsing the separated particulates with water, the particulates become free of hydrocarbons and can be left onsite.

These and other aspects of the invention are described in the detailed description of the invention and claimed in the claims that follow.

BRIEF DESCRIPTION OF THE DRAWINGS

There will now be described preferred embodiments of the invention, with reference to the sole FIGURE, by way of illustration only and not with the intention of limiting the scope of the invention, which shows the basic treatment steps of an embodiment of the invention.

DETAILED DESCRIPTION OF PREFERRED EMBODIMENTS

In this patent document, "comprising" means "including". In addition, a reference to an element by the indefinite article "a" does not exclude the possibility that more than one of the elements is present.

Referring to the FIGURE, a method of converting drilling waste into a fuel comprises contacting the drilling waste A with an acidic aqueous solution to produce an acidic aqueous slurry B (step 10), contacting the acidic aqueous slurry with a polyelectrolyte to immobilize the hydrocarbons on the particulates and form a mixture C containing a solid phase and an aqueous phase (step 12) and separating the solid phase D from the aqueous phase E for use of the solid phase as a fuel (step 14). The first step 10 breaks down emulsions that bind the waste, while the step 12 releases and separates water in the drilling waste. In step 14, dewatering produces a-crumbly solid fuel D that has properties similar to low grade coal. Steps 10, 12 and 14 may be carried out at a well site using a portable system. Step 12 may include addition of a base. Treatment preferably takes place after chilling has ceased, during production or abandonment of the well. The process may be a batch or continuous process. In the figure, each block represents a separate treatment tank or reactor (steps 10, 12) or dewatering device (step 14) and the processing units are joined by suitable pipes and valves. Drilling waste A is fed into the acid reactor using a conventional feed system such as an excavator. The acid, base and polyelectrolyte are fed into the reactors using conventional feed systems, and the pH controlled using a conventional sensor and controller. The process may be carried out at ambient temperature, for example 20° C. Addition of heat may reduce retention time but is not necessary.

In an exemplary process batch, 1 $m^3$ of drilling waste A contains 15% hydrocarbons, 2% sulfur, 68% particulates and 15% water. 75 kg of 10% HCl is added with 2 $m^3$ water at step 10 to form 3 $m^3$ of an acidic aqueous slurry B having a pH between 4 and 6. The acidic reaction retention time is 10–15 minutes. At step 12, 10 kg of a 5% solution of NaOH is added to the acidic aqueous slurry along with 0.1 kg of polyelectrolyte to form about a 3 $m^3$ mixture containing solid phase and a water phase at a pH of about 6–8. The retention time for step 12 is about 15 minutes. After dewatering at step 14, wastewater E may be disposed of, while the solid phase D may be used as a fuel.

The acid may be for example any suitable organic or inorganic acid, for example hydrochloric acid, sulphuric acid, acetic acid or phosphoric acid, and preferably the acidic aqueous slurry has a pH between 1 and 6. At lower pH, for example pH in the order of 1–2, considerable gas is produced in the acid-drilling waste reaction, which may be undesirable. The amount of acidic aqueous solution may be 1–15% of the weight of the drilling waste. Water may be added at step 10 to optimize the viscosity for mixing to take place. The water amount added to the acid reactor may be for example 0–100% of the weight of the drilling waste. To improve the acidic reaction, the acidic aqueous slurry may be agitated and mixed using pumps or paddles in the reactor. The reaction retention time for the reaction of the acidic aqueous solution with the drilling waste may be 5–30 minutes.

Depending on the ability of the polyelectrolyte to remain active in the acidic environment of the acidic aqueous slurry, addition of base may not be required and the process may operate at pH for example greater than 2. If the acidic aqueous slurry has too low pH, which may reduce the activity of polyelectrolyte in the acidic aqueous slurry B, neutralization with a base at step 12 is required. For some polyelectrolytes, for example Hyperfloc™ CF 900 series, neutralization is only required when the pH is lower than 3. For Hyperfloc™ it is preferred that the pH be in the order of 6–8 for immobilization in step 12. For some polyelectrolytes, neutralization may be carried out even when the acidic aqueous slurry has a pH greater than 3 to improve immobilization of the hydrocarbons. The wastewater E should comprise less than 100 ppm hydrocarbons to permit its safe disposal. The wastewater E may be reused at steps 10 and 12 but may require salt concentration management. To reduce acid and base consumption and minimize salt concentration management, it is preferred to optimize the introduction of acid and subsequent neutralization with a base. No more of each of the acid and base should be added than is necessary to immobilize the hydrocarbons on the particulates and reduce the hydrocarbon content of the liquid phase E below a desired amount, for example 100 ppm.

The polyelectrolyte is preferably selected from the group consisting of polyelectrolyte coagulants and polyelectrolyte flocculants, and may be a cationic acryl amid copolymer with a molecular weight of between 5,000,000 and 20,000,000, which have the active amine group in quaternized form, or a quaternary polyamine, or one of their derivatives. The polyelectrolyte may be a Hyperfloc™ polyelectrolyte available from Hychem Inc. of Florida, United States of America. Preferred is a cationic acrylamide copolymer having a molecular weight of 6,000,000 and a cationic charge of 20%. In general, the polyelectrolyte may be anionic or cationic, but a cationic polyelectrolyte is preferred, with a cationic charge between 0 and 100%. The polyelectrolyte is preferably added as a solid or liquid in aqueous solution, present in the aqueous solution in an amount between 0.1–1 weight %. An amount of polyelectrolyte in the order of 0.1–1 kg for one $m^3$ drilling waste may be used. The preferred retention time of the polyelectrolyte treatment step 12 is 1–30 min. The polyelectrolyte provides active centers of cationic ions that bind to the hydrocarbons in the acidic aqueous slurry B and also to the particulates, thus causing the hydrocarbons and particulates to coagulate together. In general, the effectiveness of the polyelectrolyte for successful immobilization of hydrocarbons is very sensitive to the pH value of the acidic aqueous slurry.

Since the amount of large particulates in the solid fuel D, which contain less hydrocarbons than small particulates, negatively affects the BTU/weight value of the solid fuel D, the large particulates amount of the acidic aqueous slurry B is preferably reduced, before contacting the acidic aqueous slurry with a polyelectrolyte, by screening the acidic aqueous slurry B to separate particulates F with a screen 16, for example those having a diameter greater than 1 mm, from the acidic aqueous slurry B. The separated particulates F may then be rinsed with water to free them of hydrocarbons, and disposed of for example as landfill. The size of particulate to be removed can vary. The smaller the screen size, the more particulates are removed, but the more difficult to free them from hydrocarbons by simple water rinsing.

Any of various bases may be used and the base itself should not present an excessive environmental hazard. The base may be selected from the group consisting of sodium hydroxide and lime, and may be added in an amount between 0 and 5% by weight of the used acid amount.

Separating the liquid phase E from the solid phase D may be carried out using a dewatering device, such as a filter press, a vacuum belt filter or a centrifuge. The solid fuel D is a black/brownish cake with a very slight odor of hydrocarbons having a density of 1.5–1.8 g/ml.

Approximately 5 $m^3$ of drilling waste may be treated per hour, and the entire remediation system may be mounted on two trailers for transportation to well sites. Combustion of the solid fuel D may be carried out by on-site combustion using thermal desorption at high temperature and combustion of the vapors, thermal desorption at moderate temperature with recovery of organics or direct combustion of the solid fuel D. However, the cost of carrying this out is high, and it is preferred to burn the solid fuel D offsite, for example at an existing coal fired power plant, or an independent power producer.

EXAMPLES

Physical properties of drilling waste (invert drilling mud and cuttings).

| | |
|---|---|
| Sample #1 | October 2000 |
| Source | British Petroleum "Ricinus Well", as obtained from Alpine Environmental, Calgary Alberta |
| Colour | Black |
| Smell | Hydrocarbons, paints, solvent, strong odour |
| Density | 1.5–1.6 g/l |
| Consistency | Sloppy, sticky and stony mass with leaching behaviour |

Qualitative Pre-investigations (Chemical Behaviours)

Mixing with water (1:1): Water cannot penetrate, (mud behaves like chewing gum), after one hour a very small thin film of free hydrocarbons on the water surface was discovered Mixing with base (1:1): NaOH (30%) does not react, (mud behaves like chewing gum), after one hour a small thin film of free hydrocarbons on the water surface was discovered Mixing with acid (1:1): HCl (33%) reacts very severely with gas development $H_2S$. Large amount of hydrocarbons was on the water surface and soil in the bottom (three phases). HCl (10%) reaction is fast with very gas development HCl (5%) reacts slowly. $H_2SO_4$ (5%) reaction is very fast, heat and gas developments.

The resulting mixtures cannot be identified without diluting with water. The diluted samples consist of three phases: soil at the bottom, water in the middle and hydrocarbons on the surface. All three phases are not completely separated from each others.

Quantitative Investigations

Example 1

100 g of drilling waste, sample 1, were mixed with 50 ml of HCl 10%. Reaction is severe with gas development. The mixture cannot be homogenized by agitating. The mixture has pH of 1. Considerable amount of hydrocarbons is free.

Example 2

100 g of drilling waste, sample 1 were mixed with 50 ml HCl 10% and diluted with 100 ml of water. Reaction is slower with minimal gas development. The resulting slurry can be agitated. Three phases were identified. The water phase has a pH of 2.

Example 3

The above example was repeated with 25 ml of HCl 10% and 100 ml water was added to the mixture. The reaction is moderate, considerable amount of hydrocarbons is free with minimal gas development. After agitating for 15 minutes the aqueous slurry was filtrated. The filtration was slow. The water phase and the soil phase contain visible free hydrocarbons. The water phase has a pH of 3.

Example 4

The above example was repeated before filtration the slurry was neutralized with NaOH solution 1% until pH 7 and 5 ml of 0.1% of cationic polyelectrolyte was added. The mixture was agitated additional 15 minutes. A new consistency was occurred. There are only two phases; clear water and sludgy solid. Excellent solid dewatering by filtration can be achieved. No free hydrocarbons were found in the filtrate (water). The solid phase (filter cake) does not show any free hydrocarbons.

Example 5

The example 4 was repeated using 5% sulphuric acid instead of 10% HCl, where other parameters have not been changed. Similar results regarding water and filter cake consistency were achieved.

Example 6

The example 4 was repeated using 10% of acetic acid instead of 10% HCl, where other parameters kept constant. Similar results regarding water and filter cake consistency were achieved.

Example 7

Example 4 was repeated using anionic polymer instead of cationic polymer, where all other parameter were kept constant. Similar results of example 4 regarding water and filter cake consistency were achieved.

Example 8

All filter cake samples were dried at room temperature over several days. The samples can be combusted by using a gas flame. This indicates the conservation of original hydrocarbons amount during the treatment process.

Investigation of Filter Cake Combustibility

Example 9

For using the filter cake as a fuel several parameters such as BTU, hydrocarbons, total carbon, sulphur and ash have to be determined. For this reason larger laboratory scale experiments were applied.

500 g of the drilling mud sample #1 were sent to the laboratory for analysis of the above-mentioned parameters. Another 500 g of the drilling mud sample #1 were treated with the same procedure of example 4. The added fresh water amount was 500 ml. The addition of acid was controlled by using pH-probe and at pH=4. This has optimized the consumption of acid and base, which was used later for neutralisation. After dewatering the solid the filter cake was dried at room temperature for two days and sent for analysis of the above-mentioned parameters.

The analytical results of both samples are listed in the following table.

| Sample #1 | BTU [/Lb] | Hydrocarbons [%] | Sulphur [%] | Ash [%] |
| --- | --- | --- | --- | --- |
| Original | 3710 | 18.9 | 2.82 | 77 |
| After treatment | 3400 | 17.3 | 3.23 | 80 |

Filter Cake Investigation Regarding the Environment

| Physical properties of filter cake | |
| --- | --- |
| Sample | Filter cake of the examples 2–9 |
| Colour | Black/Brownish |
| Smell | No odour, it smells lightly like hydrocarbons |
| Density | 1.5–1.6 g/l |
| Consistency | Like filter cake when it is wet. Crumbling when it is dry. No projected leaching potential, suitable for transportation and storage. |

Investigation of Filter Cake Leaching and Filtrate Reuse

Example 10

Water was added to the dried filter cake in the ratios of 1:1; 2:1 and 3:1 at room temperature and pH=5–7. The mixtures were agitated for 8 hours. No desorption of hydrocarbons was noticed. Dewatering was easy to achieve by filtration.

Example 11

The example 9 was repeated using the filtrate of example 9 instead of fresh water. Similar reaction behaviour was observed. The analytical results are very comparable with the treatment with fresh water.

Results are in the Following Table.

| Sample #1 | BTU [/Lb] | Hydrocarbons [%] | Sulfur [%] | Ash [%] |
| --- | --- | --- | --- | --- |
| Original | 3710 | 18.9 | 2.82 | 77 |
| After treatment (reused water) | 3770 | 17.8 | 3.30 | 80 |

Process Reproducibility

The developed process was simulated with another two different drilling waste samples. These samples were treated according to the developed and applied process of sample #1. To increase the BTU of the converted fuel, the aqueous slurry was screened after the acid treatment for separation of large particulates from the converted fuel.

| Sample #2 | September 2001 |
| --- | --- |
| Source | British Petroleum "Grand Prairie Well", as obtained from Alpine Environmental, Calgary Alberta |
| Colour | Black |
| Smell | Hydrocarbons, solvent, strong odour |
| Density | 1.7–1.8 g/l |
| Consistency | Sloppy, sticky and stony mass with leaching behaviour |
| pH value | 9.5 |

Quantitative Investigations

Example 12

100 g of drilling waste, sample 2 were mixed with 25 ml of HCl 10% and 100 ml water was added to the mixture. The reaction is moderate and considerable amount of hydrocarbons is free with minimal gas development. After agitating for 15 minutes the aqueous slurry was screened using 3 mm mesh. The water phase and the soil phase contain visible free hydrocarbons. The water phase has a pH of 3. The separated particulates were rinsed with 100 ml fresh water. The slurry with the used rinsing water was neutralized with NaOH solution 1% until pH 7 and 10 ml of 0.3% of cationic polyelectrolyte was added. The mixture was agitated additional 15 minutes. A new consistency was occurred. There are only two phases, clear water and sludgy solid. Excellent solid dewatering by filtration can be achieved. No free hydrocarbons were found in the filtrate (water). The solid phase (filter cake) does not show any free hydrocarbons.

Example 13

The example 12 was repeated using 5% sulphuric acid instead of 10% HCl, where other parameters have not been changed. Similar results regarding water, separated particulate and filter cake consistency were achieved.

Example 14

The example 12 was repeated using 5% Phosphoric acid instead of 10% hydrochloric acid, where other parameters have not been changed. Similar results regarding water, separated particulate and filter cake consistency were achieved.

Example 15

The example 12 was repeated using 10% of acetic acid instead of 10% HCl, where other parameters kept constant. Similar results regarding water and filter cake consistency were achieved.

Example 16

Example 12 was repeated using anionic polymer instead of cationic polymer, where all other parameter were kept constant. A better coagulation, filter cake consistency and dewatering behaviour were achieved with the cationic polyelectrolyte.

Investigation of Filter Cake Combustibility

Example 17

All filter cake samples were dried at room temperature. The samples individually showed combustible behaviour. For using the filter cake as a fuel several parameters such as BTU, hydrocarbons, total carbon, sulphur and ash content have to be investigated. For this reason larger laboratory scale experiments were applied.

Example 18

500 g of the drilling mud sample #2 were sent to the laboratory for analysis of the above-mentioned parameters. Another 500 g of the drilling mud sample # 2 were treated with the same procedure of example 12. The added fresh water amount was 500 ml. The addition of acid was controlled by using pH-probe and at pH=4, where the screening of the aqueous slurry occurred. The separated particulates were rinsed with 500 ml fresh water. After screening the particulates the slurry was neutralized using 1 n NaOH solution until pH=7. 10 ml of a 0.3% cationic polyelectrolyte solution were added to the mixture and agitated for further 15 min. The mixture was filtered for dewatering of the solid. The filtrate was saved for rinsing the next sample. The filter cake was dried at room temperature for two days and sent with the separated and rinsed particulate for analysis.

The analytical results of the samples are listed in the following table.

| Sample #2 | BTU [/Lb] | Hydrocarbons [%] | Sulphur [%] | Ash [%] |
|---|---|---|---|---|
| Original | 3200 | 17.8 | 0.82 | 77 |
| After treatment | 3400 | 18.1 | 0.63 | 80.5 |
| Separated particulates | — | 0.5 | — | 99.5 |

Physical Properties of Filter Cake

| Physical properties of filter cake | |
|---|---|
| Sample | Filter cake of the examples 12–16 |
| Colour | Black/Brownish |
| Smell | No odour, it smells lightly like hydrocarbons |
| Density | 1.5–1.6 g/l |
| Consistency | Like filter cake when it is wet. Crumbling when it is dry. No projected leaching potential, suitable for transportation and storage. |

Investigation of Filter Cake Leaching and Filtrate Reuse

Example 19

Water was added to the dried filter cake in the ratios of 1:1; 2:1 and 3:1 at room temperature and pH=5–7. The mixtures were agitated for 8, 24, 48 hours. No desorption of hydrocarbons was noticed. Re-dewatering was easy to achieve by filtration.

Example 20

The experiment 18 was repeated using the filtrate of experiment 18 instead of fresh water. Similar reaction behaviour was observed. The analytical results are very comparable with the treatment with fresh water.

The results are listed in the following table.

| Sample #2 | BTU [/Lb] | Hydrocarbons [%] | Sulphur [%] | Ash [%] |
|---|---|---|---|---|
| Original | 3200 | 17.8 | 0.82 | 77 |
| After treatment (reused water) | 3500 | 18.6 | 0.45 | 80 |
| Separated particulates | — | 0.3 | — | 99.7 |

Process Reproducibility

The developed process was simulated with an additional different drilling waste sample. No differences were observed in the results.

An ultimate analysis performed by Alberta Research Council on two samples of fuel produced from operation of the process of the invention and an Alberta, Canada, sub-bituminous coal sample yielded the compositions shown in the table below.

Table of Ultimate Analysis Results

| | Composition (mass percent) | | | | | | |
|---|---|---|---|---|---|---|---|
| | Water | Ash | Carbon | Hydrogen | Nitrogen | Sulfur | Oxygen |
| Synthetic Fuel #1 | | | | | | | |
| as received | 7.43 | 79.33 | 10.68 | 1.44 | 0.1 | 1.01 | 0.01 |
| dry | 0 | 85.69 | 11.54 | 1.56 | 0.11 | 1.09 | 0.01 |
| dry, ash free | 0 | 0 | 80.64 | 10.9 | 0.77 | 7.62 | 0.07 |
| Synthetic Fuel #2 | | | | | | | |
| as received | 7.88 | 76.27 | 13.28 | 1.62 | 0.01 | 0.68 | 0.26 |
| dry | 0 | 82.80 | 14.41 | 1.76 | 0.01 | 0.74 | 0.28 |
| dry, ash free | 0 | 0 | 83.78 | 10.22 | 0.06 | 4.29 | 1.64 |
| AB coal | | | | | | | |
| as received | 17.6 | 10.2 | 53.23 | 3.1 | 0.66 | 0.08 | 15.1 |
| dry | 0 | 12.38 | 64.6 | 3.8 | 0.8 | 0.1 | 18.3 |
| dry, ash free | 0 | 0 | 73.7 | 4.34 | 0.9 | 0.1 | 20.9 |

An ash analysis carried out by Alberta Research Council yielded the composition shown below Table of Ash Composition Analysis Results for Synthetic Fuel Sample

| $SiO_2$ | $Al_2O_3$ | $TiO_2$ | $Fe_2O_3$ | CaO | MgO | $Na_2O$ | $K_2O$ | $P_2O_5$ | $SO_3$ | Ba | Sum |
|---|---|---|---|---|---|---|---|---|---|---|---|
| Synthetic Fuel #1 Ash Composition (mass percent) | | | | | | | | | | | |
| 57.12 | 6.49 | 0.43 | 4.25 | 2.59 | 0.93 | 0.42 | 1.27 | 0.13 | 6.24 | 19.35 | 99.22 |
| Synthetic Fuel #2 | | | | | | | | | | | |
| 48.50 | 5.99 | 0.22 | 2.42 | 0.98 | 0.70 | 0.52 | 1.01 | 0.07 | 0.62 | 36.37 | 97.28 |
| Alberta sub-bituminous coal ash composition (mass percent) | | | | | | | | | | | |
| 45.36 | 22.59 | 0.64 | 4.95 | 17.09 | 1.91 | 0.23 | 0.58 | 0.11 | 2.83 | 0.33 | 96.62 |

The compositions and combustion of sample material shows that the combustible material in the synthetic fuel ignites and burns easily with no products of incomplete combustion. Depending on the manner of combustion, the synthetic fuel may be blended with another fuel to increase the heating value and reduce the relatively high ash and sulfur content. A stand alone combustion system may require flue gas scrubbing to capture and remove $SO_2$ in order to meet regulatory requirements, depending on the jurisdiction. For use as a supplemental fuel in existing power plants such as pulverized coal-fired power plants, care must be taken in evaluating such concerns as tube corrosion, fly ash resistivity and slagging properties due to potential high barium and chloride content. Essentially all of the combustible material in the synthetic fuel samples became volatile on heating to 600° C. A two stage combustion process, such as the gasification technology developed by Ethopower Corp., Kelowna, Canada, may be an appropriate way to burn this fuel. This process separates combustion into a relative low temperature gasification/pyrolysis phase followed by combustion of the hydrocarbon vapors. Such a two stage method might reduce $SO_2$ emissions and potential concerns due to barium and chloride compounds by retaining the sulfur, barium and chlorides in the ash. The synthetic fuel may be appropriate for co-firing in a cement kiln. The fuel would ignite well and burn completely under kiln conditions. One advantage of adding the material as a kiln fuel is the inherent sulfur capture by the abundance of calcium compounds in the kiln.

Immaterial modifications may be made to the invention described here without departing from the essence of the invention.

What is claimed is:

1. A method of converting drilling waste into a fuel, in which the drilling waste comprises particulates and hydrocarbons, the method comprising the steps of:
   contacting the drilling waste with an acidic aqueous solution to produce an acidic aqueous slurry;
   immobilizing the hydrocarbons on the particulates in the acidic aqueous slurry by addition of a coagulant to the acidic aqueous slurry to form a mixture containing a solid phase and an aqueous phase; and
   separating the solid phase from the aqueous phase for use of the solid phase as a fuel.

2. The method of claim 1 in which immobilizing the hydrocarbons on the particulates comprises binding the hydrocarbons with the particulates by contact with a polyelectrolyte acting as the coagulant.

3. The method of claim 2 in which the solid phase is used as a fuel.

4. The method of claim 2 further comprising the step of adding a base to the acidic aqueous slurry to improve the binding action of the polyelectrolyte.

5. The method of claim 1 in which the aqueous phase comprises less than 100 ppm hydrocarbons.

6. The method of claim 2 in which the polyelectrolyte is selected from the group consisting of cationic acryl amid copolymers with a molecular weight of between 5,000,000 and 20,000,000 and quaternary polyamines.

7. The method of claim 2 in which the polyelectrolyte is a cationic acrylamide copolymer.

8. The method of claim 7 in which the cationic acrylamide copolymer has a cationic charge of 0–100%.

9. The method of claim 1 in which the acidic aqueous slurry has a pH between 1 and 6.

10. The method of claim 9 in which the amount of acidic aqueous solution is 1–15% of the weight of the drilling waste.

11. The method of claim 1 in which water is added to the acidic aqueous slurry in the amount of 0–100% of the weight of the drilling waste.

12. The method of claim 1 further comprising agitating and mixing the acidic aqueous slurry.

13. The method of claim 12 in which the reaction retention time for the reaction of the acidic aqueous solution with the drilling waste is 5–30 minutes.

14. The method of claim 1 further comprising the step of, before immobilizing the hydrocarbons on the particulates, screening the acidic aqueous slurry to separate particulates having a diameter greater than a selected size from the acidic aqueous slurry.

15. The method of claim 14 in which the screen removes particulates having a diameter greater than 1 mm.

16. The method of claim 15 further comprising the step of rinsing the separated particulates with water to free them of hydrocarbons.

17. The method of claim 15 in which the hydrocarbons are immobilized by the coagulating effect of a polyelectrolyte added to the acidic aqueous slurry.

18. The method of claim 17 further comprising the step of adding a base to the acidic aqueous slurry to improve immobilization of the hydrocarbons on the particulates.

19. The method of claim 18 in which the base is selected from the group consisting of sodium hydroxide and lime.

20. The method of claim 19 in which the base is added in an amount between 0 and 5% by weight of the used acid amount.

21. The method of claim 2 in which the polyelectrolyte is added as a solid or liquid in aqueous solution.

22. The method of claim 21 in which the polyelectrolyte is present in the aqueous solution in an amount between 0.1–1 weight %.

23. The method of claim 2 in which the amount of polyelectrolyte is 0.1–1 kg for one $m^3$ drilling waste.

24. The method of claim 2 in which the reaction retention time of the polyelectrolyte is 1–30 min.

25. The method of claim 1 in which separating the solid phase from the liquid phase is carried out using a dewatering device.

26. The method of claim 25 in which the dewatering device is selected from the group consisting of a filter press, a vacuum belt filter and a centrifuge.

27. A method of converting drilling waste into a fuel, in which the drilling waste comprises particulates and hydrocarbons, the method comprising the steps of:

contacting the drilling waste with an acidic aqueous solution to produce an acidic aqueous slurry;

contacting the drilling waste with a polyelectrolyte coagulant having centers of cationic activity to immobilize the hydrocarbons on the particulates and form a mixture containing a solid phase and an aqueous phase; and separating the solid phase from the aqueous phase for use of the solid phase as a fuel.

* * * * *